(12) United States Patent
Subbiondo et al.

(10) Patent No.: US 7,477,367 B2
(45) Date of Patent: Jan. 13, 2009

(54) CELESTIAL OBJECT IDENTIFICATION DEVICE

(75) Inventors: John Subbiondo, Rancho Santa Margarita, CA (US); K. David Crockett, Mission Viejo, CA (US)

(73) Assignee: Yamcon, Inc., Rancho Santa Margarita, CA (US)

( * ) Notice: Subject to any disclaimer, the term of this patent is extended or adjusted under 35 U.S.C. 154(b) by 189 days.

(21) Appl. No.: 11/449,269

(22) Filed: Jun. 7, 2006

(65) Prior Publication Data

US 2007/0283583 A1    Dec. 13, 2007

(51) Int. Cl.
*G01B 11/26* (2006.01)

(52) U.S. Cl. .................................... 356/139.01

(58) Field of Classification Search ....... 356/3.01–3.15, 356/4.01–4.1, 5.01–5.15, 6–22, 139.01–139.1
See application file for complete search history.

(56) References Cited

U.S. PATENT DOCUMENTS

| | | | |
|---|---|---|---|
| 2,372,487 A | 3/1945 | Hagner | |
| 2,994,971 A | 8/1961 | Meisenheimer et al. | |
| 3,257,728 A | 6/1966 | Blomquist | |
| 3,769,710 A | 11/1973 | Reister | 33/320 |
| 4,096,646 A | 6/1978 | Solem | 35/43 |
| 4,104,722 A | 8/1978 | Evans | 364/455 |
| 4,621,329 A | 11/1986 | Jacob | 364/455 |
| 4,702,011 A | 10/1987 | Sigley | 33/268 |
| 4,764,881 A | 8/1988 | Gagnon | 364/559 |
| 4,938,697 A | 7/1990 | Mayer | 434/289 |
| 4,944,587 A | 7/1990 | Harigae | 356/152 |
| 4,970,793 A | 11/1990 | Atamian | 33/268 |
| 5,003,698 A | 4/1991 | Vuarnesson | 33/268 |
| 5,133,050 A | 7/1992 | George et al. | 395/135 |
| 5,155,327 A | 10/1992 | Hoag | 219/121 |
| 5,161,242 A | 11/1992 | Boulay | 364/455 |
| 5,269,065 A | 12/1993 | Ida | 33/269 |
| 5,311,203 A | 5/1994 | Norton | 345/7 |
| 5,546,309 A | 8/1996 | Johnson et al. | 364/434 |
| 5,574,465 A | 11/1996 | Okada | 342/357 |
| 5,704,653 A | 1/1998 | Lee | 283/34 |
| 5,808,732 A | 9/1998 | Williams | 356/139.01 |
| 5,815,411 A | 9/1998 | Ellenby et al. | 701/207 |
| 6,056,554 A | 5/2000 | Samole | 434/289 |
| 6,172,747 B1 | 1/2001 | Houlberg | 356/139.04 |
| 6,304,376 B1 | 10/2001 | Baun et al. | 356/429 |
| 6,369,942 B1 | 4/2002 | Hedrick et al. | 359/430 |

(Continued)

*Primary Examiner*—Thomas H Tarcza
*Assistant Examiner*—Luke D Ratcliffe
(74) *Attorney, Agent, or Firm*—Paul J. Backofen, Esq.; K. David Crockett, Esq.; Crockett & Crockett (57) ABSTRACT

A celestial object locating device according to the present disclosure enables a user to unambiguously identify one or more stars or other celestial objects. The celestial object locating device may also direct a user to a desired celestial object or objects. The device may be useful for locating or identifying stars, constellations, and deep sky objects without knowing a users location or time of day. The celestial object locating device determines the angle between selected visible stars and compares these angles to angles between known stars to determine the location of all other stars. The device includes a 3-axis magnetic field sensor and a 3-axis gravitational field sensor that operate with a processor and an electronic database to perform the required calculations. The device's database may be updated using any suitable method such as flash drives, network connections or other.

7 Claims, 4 Drawing Sheets

U.S. PATENT DOCUMENTS

| | | | |
|---|---|---|---|
| 6,392,799 B1 | 5/2002 | Baun et al. | 359/430 |
| 6,445,498 B1 | 9/2002 | Baun et al. | 359/430 |
| 6,563,636 B1 | 5/2003 | Baun et al. | 359/429 |
| 6,570,506 B2 | 5/2003 | Lemp | 340/815.4 |
| 6,922,283 B2 | 7/2005 | Baun et al. | 359/399 |
| 7,053,992 B2 | 5/2006 | La Belle et al. | 356/6 |
| 7,092,156 B2 | 8/2006 | Baun et al. | 359/430 |
| 2004/0047036 A1* | 3/2004 | Baun et al. | 359/430 |

* cited by examiner

CELESTIAL OBJECT IDENTIFICATION DEVICE

FIELD OF THE INVENTIONS

The inventions described below relate the field of astronomy, and more specifically to electronic celestial object locating devices.

BACKGROUND OF THE INVENTIONS

As a result of improvements in technology, some telescope manufacturers have been working on devices for assisting amateur sky watchers in finding specific stars, groups of stars or other celestial objects. Some of these devices suffer from one or more complexities or high cost that limit their widespread use by the public. For example, U.S. Pat. No. 6,392,799 which is implemented in commercially available computerized telescopes, discloses a system for aligning a telescope which requires that the user first enter his location, the date and the time of use (including figuring out if he is in daylight savings time or not, which few users care to commit to memory), then mechanically rotate the scope to a home position relative to its drive motors to set the starting point for its encoders, and then requires the user to pick up the scope and point it north, very few people can accurately point to magnetic north, even using a compass, and fewer still can distinguish between magnetic north and true north, and then requires that the user level the telescope and tell the system that the scope is aligned, whereupon the telescope will slew to an expected altitude-azimuth position of a bright star such a Vega, Arcturus, Sirius, etc., whereupon the user is instructed to adjust the scope with fine slewing adjustments to center the bright star in the field of view and tell the scope that the bright star is centered in the field of view, whereupon the telescope slews to the vicinity of a second bright star and the system again instructs the user is instructed to adjust the scope with fine slewing adjustments to center the bright star in the field of view and tell the scope that the bright star is centered in the field of view, whereupon the alignment often fails and the user must restart the procedure from scratch. Beside the labor of this procedure, its success depends on perfect initial rotation to home, accurate leveling and orienting to north, and accurate entry of time, date and location. If the user is just a few degrees off on any of these steps, or a few minutes off on the time, or a short distance off on location, the scope will slew to the alignment stars but will be a few degrees off. The alignment stars will probably not appear in the spotting scope, and definitely will not appear in the main scope. A novice user has no hope of aligning the scope, and must learn the names of several prominent stars that the system is likely to use (Vega, Arcturus, Spica, for example, if it is summer), then center the telescope's spotting scope on the prominent star, in which case the user must know the position of the prominent star amongst its immediate neighbors visible in the spotting scope, and then seek to center the prominent star in the small (about 1° for a low magnification 25 mm plossi eyepiece) field of the view, in which case the user preferably knows the star pattern around the prominent star, so that he may center that star rather than the many other stars that appear in the field of view. The user must know the large field, spotting scope field, and main scope field for at least two stars that are likely to be visible, but in practice must know several stars (in case Spica is already low and hidden by fog or a marine layer, or Vega is behind a mountain, or Arcturus is hidden by a neighbor's tree). If the user succeeds in the summer time, he must learn a new set of stars come fall, spring or winter, when Vega, Arcturus, Spica are no longer visible, but Betelguese, Sirius, and Aldebaran are visible. Thus, familiarity with the night sky is required for the successful use of this system, but many people see that as a difficult task, and it is precisely the task that is supposedly obviated by the system.

Locating stars is much easier with our own SkyScout™ device, and application of the technology disclosed in our U.S. Pat. No. 6,366,212 to telescopes will greatly facilitate alignment and subsequent locating and identification of celestial objects. To calibrate the SkyScout™ device, or a telescope fitted with the device, the user simply turns the device on.

Both systems discussed above benefit from the retrieval or entry of accurate time and position data. Time and position data can be obtained through GPS or other electronic positioning system, or it can be manually entered. Each has its advantages and disadvantages. GPS positioning is accurate and easy for the user, but requires additional hardware and software adding substantial development and manufacturing cost. Manual entry requires little additional hardware, but is tedious for the user and mistakes in entry such as entry of the incorrect time or forgetting daylight savings time, result in inaccuracy that may not be apparent to a user. For example, near the celestial equator, one minute of error in time will translate into 0.5 degree of error in the sky, a thumb's width at an arm's length. Errors in manual entry are likely to leave the user frustrated by a device that appears to be broken, if they are sharp enough to know the device is pointing to the wrong star. An equally problematic issue is not knowing your precise location when you are in a rural area without a zip code such as a wilderness area.

What is needed is a device for locating and identifying celestial objects that does not include expensive and complicated GPS components and does not require manual entry of accurate time and or location information to calibrate the device.

SUMMARY

The devices and methods described below provide for accurate location and identification of celestial objects in a location, without the need to enter or retrieve time and position data. The celestial object locating device enables a user to unambiguously identify and or locate stars or other celestial objects. The celestial object locating device may also direct a user to celestial objects. The device may be useful for identifying or locating stars, constellations, deep sky objects and planets without knowing a user's location or time of day, or even the date. The celestial object locating device determines the angle between selected visible stars and compares these angles to angles between known stars to determine the orientation of the celestial sphere relative to earth's magnetic and gravitational vectors at the user's position and thus the location of all other celestial objects. The device includes a 3-axis magnetic field sensor and a 3-axis gravitational field sensor that operate with a processor and an electronic database to perform the required calculations. The device's database may be updated using any suitable method such as flash cards, drives, network connections or any other technique.

A celestial object locating device may be "calibrated" without knowing the user's location, the date or time of day. The user instead calibrates the device by sighting the device on two or more visible stars. The three-axis gravitational and magnetic sensors enable the device to determine the angular difference in position between the reference stars, compare them to a database of known stars, and then determine their identity. Once the identities of the stars are known, the relative position of the celestial sphere to the user is known and any objects in the database may be located and or identified.

A device according to the present disclosure allows a user to calibrate the device and then point the device at a celestial object and the device announces to the user of the celestial object's identity. In another aspect of the present disclosure, after calibration, the user directs the device to find a desired celestial object or objects.

A celestial object locating device may include a viewing apparatus, a processor, a 3-axis magnetic sensor, a 3-axis gravitational sensor, a timer, a database, one or more data output elements and a user interface. The viewing apparatus aligns the users sight path to the viewing axis of the device, the viewing axis defined by an azimuth angle and a nadir angle. The 3-axis magnetic sensor provides the processor with azimuth data representing the azimuth angle. The 3-axis gravitational sensor provides the processor with nadir data representing the nadir angle. Sighting along the viewing axis, a user selects two of more stars in succession. The device saves the azimuth data and nadir data for each selected star. The processor computes the angular separation between the selected stars and compares the angular separation to known angular separations between known stars to determine the orientation of the celestial sphere.

A timer may be used to determine elapsed time starting at the selection of the first star. The elapsed time may permit the angular separation data to be determined more accurately. Elapsed time from the selection of the first star may also permit more accurate tracking of the celestial sphere after calibration. The database may contain data that may be used by the processor enabling the processor to determine celestial coordinates of right ascension and declination corresponding to the viewing axis based on the azimuth data, the nadir data, and the elapsed time data. The timer provides elapsed time to the processor.

The celestial object locating device may also store two or more recently used reference objects and the relative angles between them. The stored 'favorite' reference objects will be used as the first to be compared to the calculated reference angles to expedite calibration of the celestial object locating device.

The celestial object locating device may also include compensation instructions and/or compensation data in the database useable by the processor such that the processor may compensate for precession, earth elongation, magnetic variation, parallax, nutation, or any combination thereof. A temperature sensor may also be included to enable the processor to make thermal error compensations for the magnetic and gravitational sensors.

DETAILED DESCRIPTION OF THE INVENTIONS

Figure 1:
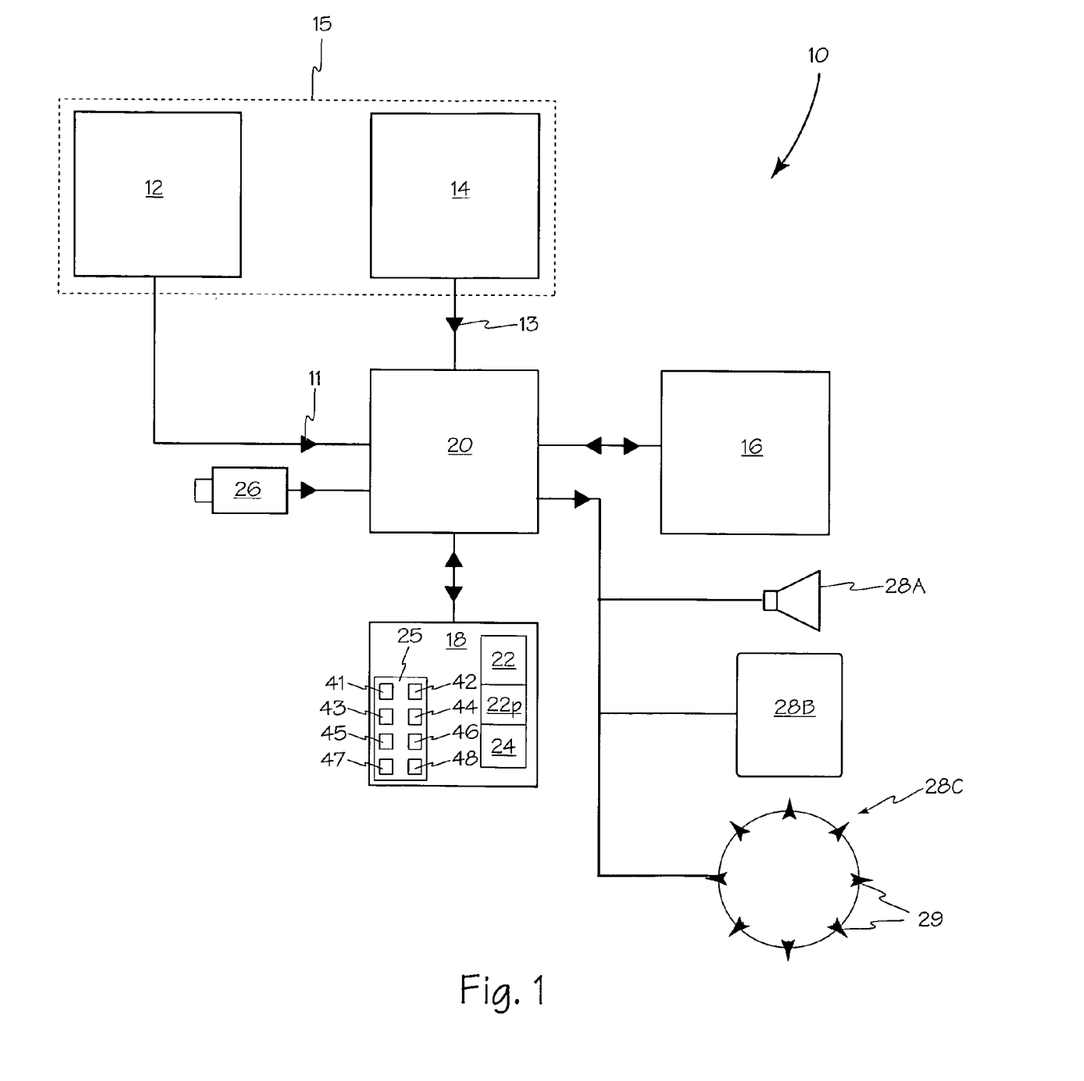
FIG. 1 is a block diagram of a celestial object locating device according to the present disclosure.

Celestial object locating device 10 of FIG. 1 includes magnetic sensor 12, gravity sensor 14, memory 18 and processor 20. A timer such as timer 16 may also be included. Timer 16 may be an optional element of celestial object locating device 10. Inclusion of timer 16 permits a celestial object locating device to compensate for the rotation of the earth. Without timer 16 a celestial object locating device may require recalibration at intervals. Celestial object locating device may be any suitable device such as a non-optical tube, a telescope, binoculars or any other viewing apparatus that may be hand held, or require mounting and or stabilization with a suitable support.

Figure 2:
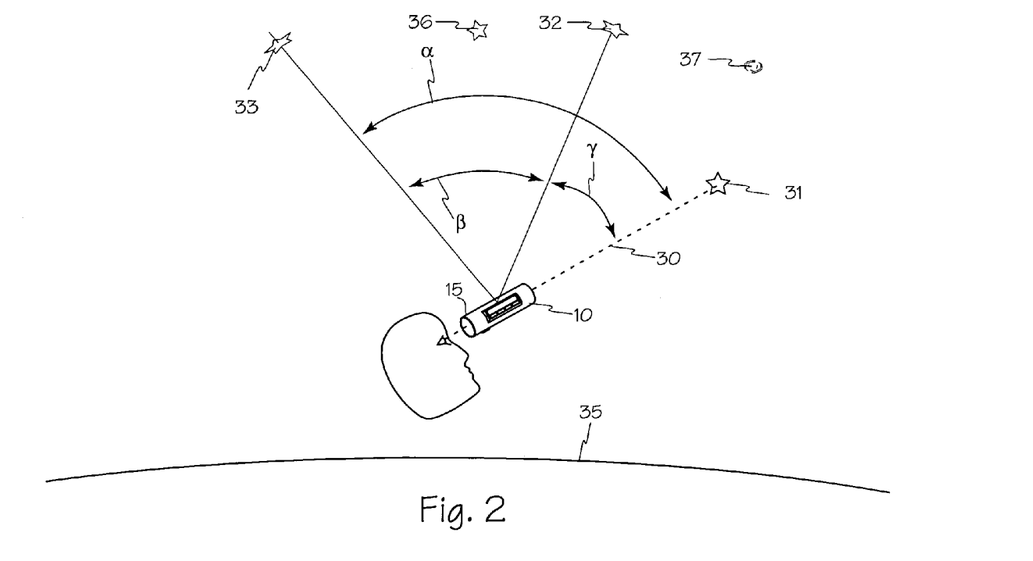
FIG. 2 is a perspective diagram of the relative orientation of a celestial object locating device and reference objects.

Memory 18 may store data 25 for processor 20 and also store database 22 of celestial objects and also store database 24 of angular separation data between selected celestial objects. Selection device 26 may be used to select a celestial object when a user is observing on the viewing axis 30 as shown in FIG. 2. Selection device 26 may be a button or any other suitable data entry device. Magnetic sensor 12 is a three axis sensor for quantifying the orientation of device 10 with respect to the magnetic field of the earth. Gravity sensor 14 is a three axis sensor for quantifying the orientation of device 10 with respect to the center of mass of the earth. The output of gravity sensor array or a suitable alternative will be referred to here as altitude data. Altitude data will be used to determine the angle between the viewing axis and a line from the center of device 10 and the center of mass of the earth. Any suitable sensors may be used, for example, orthogonal axis sensors may be used to obtain high accuracy and sensors with less than three axes may be used for less accurate results.

One or more annunciators, displays, indicators or other suitable devices such as devices 28A, 28B and 28C may be provided to present information to a user. Any suitable audio generator may be used such as speaker 28A. Display 28B may provide textual and or graphic information to a user. An array such as array 28C having multiple individual elements 29 may also be used to direct a user to orient viewing axis 30 to observe a selected celestial object or objects.

Celestial object locating device 10 of FIG. 2 includes viewing axis 30 extending through the generally cylindrical housing 15. A user may calibrate celestial object locating device 10 by sequentially aligning viewing axis 30 with two or more reference objects such as stars 31, 32 and or 33 as shown. Orientation sensors on or in housing 15 will detect the orientation of celestial object locating device 10 relative to the earth and calculate the angular separation between the reference objects sighted and compare the reference angles to angular separations between known stars to determine the orientation of the celestial sphere relative to the user. Because the axis of the celestial sphere is collinear with the axis of the earth, the orientation of the celestial sphere may be stored as an orientation angle, or the rotational angle of any suitable reference on the celestial sphere relative to the users position on the earth.

Figure 3:
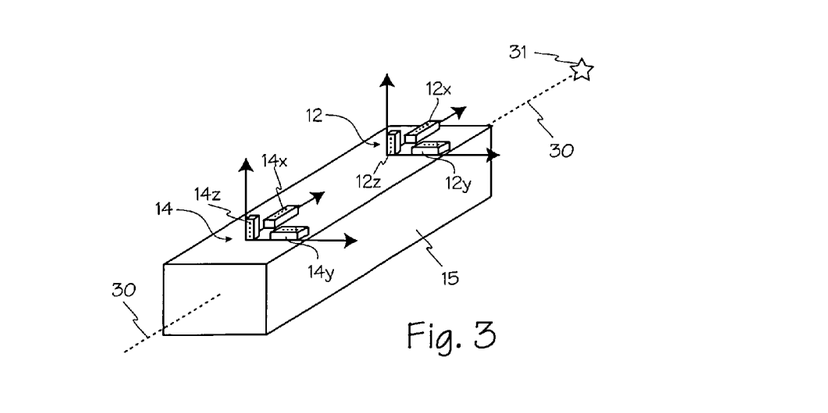
FIG. 3 is a perspective diagram of the relative orientation of sensors to the viewing axis.

FIG. 3 illustrates the arrangement of position sensor arrays 12 and 14 in relation to viewing axis 30. Magnetic field sensor array 12 and gravitational sensor array 14 are mounted on or in housing 15, in fixed relationship to viewing axis 30. Magnetic field sensor array 12 includes one magnetic sensor for each axis associated with a coordinate system defined relative to device 10 and its viewing axis 30. This coordinate system is defined by the viewing axis, a second axis perpendicular to the viewing axis and initially oriented upward relative to the ground when in use, and a third axis perpendicular to the first and second axes. Though these axes may be conceived of as vertical or horizontal when considering the methods described herein, the tilting and twisting of the device in use will cause these axes to shift with no essential relationship to the terrestrial coordinate systems. A first magnetic field sensor 12x is aligned parallel to the viewing axis, and a second magnetic field sensor 12y is arranged perpendicular to the first sensor, and a third magnetic field sensor 12z is aligned perpendicular to the first and second magnetic field sensors, thus forming an array of three orthogonal magnetic sensors. Gravitation sensor array 14 includes a first gravitational sensor 14x arranged in parallel to the viewing axis and a second gravitational sensor 14y arranged perpendicular to the first sensor, and a third gravitational sensor 14z is aligned perpendicular to the first and second gravitational sensors, thus forming an array of three orthogonal gravitational sensors. Each of the magnetic field sensors and gravitational sensors are connected to processor 20 to provide magnetic data 11 and gravitational data 13 to the microprocessor. While gravitational and magnetic sensors are described, any other suitable sensors or combination of sensors may be used.

Any other suitable sensor, sensors, or sensor arrays may replace magnetic sensor array 12, and or gravitational sensor array 14. For example, to offer a low cost device with less accuracy, a single-axis inclinometer might be used as an alternative to gravitational sensor array 14. Inclinometers are not suitable for use in hand-held devices such as celestial object locating device 10. Any rotation or twisting of device 10 about viewing axis 30 will cause an inclinometer to lose accuracy. The degree of the rotation about the viewing axis will control the inaccuracy. Sufficient rotation of device 10 will render an inclinometer useless. Although an inclinometer might operate as a low cost, less accurate alternative to multi-axis sensor arrays, an inclinometer is not equivalent to multi-axis sensor arrays.

Figure 4:
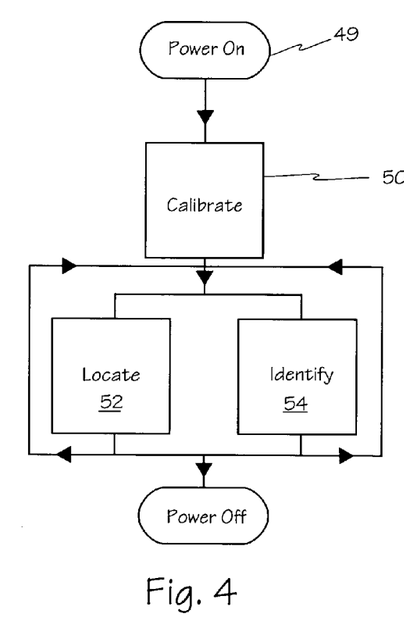
FIG. 4 is a flow chart for a celestial object locating device according to the present disclosure.

Referring now to FIG. 2 and FIG. 4, a user on or near earth 35 may operate celestial object locating device 10 to locate one or more celestial objects such as star 36 or object 37. At step 49 a user must first turn device 10 on, and then calibrate device 10 as in process 50, by sequentially orienting viewing axis 30 to observe 2 or more reference objects such as stars 31, 32 and 33.

Reference objects may be any suitable celestial objects such as stars. Reference objects may have any suitable magnitude. In practice, reference objects may be organized in the database according to magnitude. Thus, use of brighter objects may result in faster calibration.

Figure 5:
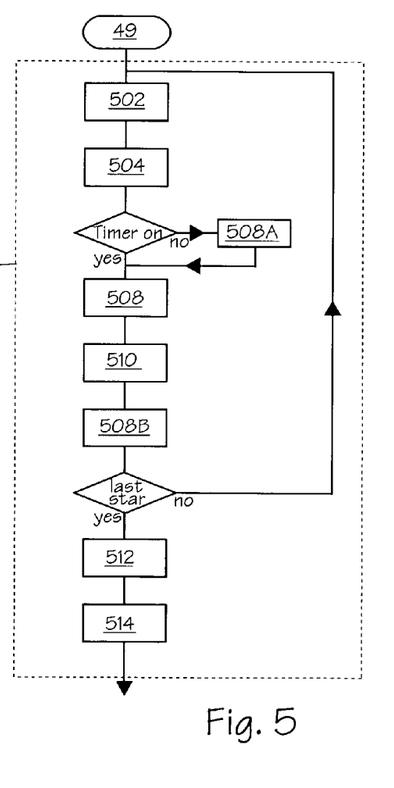
FIG. 5 is a detailed flow chart of the calibration process according to the present disclosure.

Referring now to FIG. 2 and FIG. 5, at step 502, a user aligns viewing axis 30 along a line from the viewers eye to the first star such as star 31, at step 504 the user selects star 31 as a reference object using any suitable technique such as switch 26, electrical contact, remote control, voice command or any other. Actuation of switch 26 simultaneously captures first magnetic data 41 and first gravitational data 42. If a timer such as timer 16 is included, actuation of switch 26 also initiates timer 16 if it is off, or captures timer data if timer 16 is running. Captured data may be stored in memory 18 or in any other suitable location. The user next orients the viewing axis to another star such as star 32, and again selects star 32 as a reference object capturing second magnetic data 43 and second gravitational data 44 and second timer data 47.

Upon capturing data from a second reference object, at step 512, processor 20 may use data 41, 42, 43, and 44 to compute angular separation γ between the reference objects 31 and 32. If a timer such as timer 16 is included in device 10, processor 20 may also use data 47 to compute angular separation γ between the reference objects. At step 514, angle γ may be used to determine the identity of reference objects 31, and 32. Upon determining the identity of the reference objects, the orientation of celestial sphere 40 will be known relative to the user.

If device 10 is unable to calibrate using only the data thus captured, a user may be prompted to identify another reference object. The user next orients viewing axis 30 to a star such as star 33, and again selects the star as a reference object capturing third magnetic data 45, third gravitational data 46 and third timer data 48.

Upon capturing data from a final reference object, at step 512, processor 20 may use data 41, 42, 43, 44, 45 and 46 to compute angular separation α, β, and γ between the reference objects. If a timer such as timer 16 is included in device 10, processor 20 may also use data 47 and 48 to compute angular separation α, β, and γ between the reference objects. At step 514, angles α, β, and γ may be used to determine the identity of reference objects 31, 32 and 33. Upon determining the identity of the reference objects, the orientation of celestial sphere 40 will be known relative to the user. Thereafter, the orientation of device 10, and elapsed time if a timer is included, may be used to find a desired object such as star 36 in process 52, or to identify an unknown object such as celestial object 37 in process 54.

Use of reference angles α, β, and γ to determine the identity of the reference objects may be accomplished using any suitable process. For example, the angular separation between likely reference objects may be computed in advance and stored in database 24 as known reference angles. Then the reference angles such as α, β, and γ may be compared to known reference angles from database 24 to determine the identity of the reference objects.

Alternatively, the angular separation of possible reference objects may be determined with every use. In this alternate process, at step 514, processor 20 may compute the angular separation between a first reference star and a second reference star. The computed angular separation is then compared to reference angles α, β, and γ. If no match is found, processor 20 may compute the angular separation between the first reference star and a third reference star. This procedure may continue until the reference angles have been matched and the reference objects identified.

If the computations of angular separation of possible reference objects are to be performed with every use, database 24 may store some of the recently identified reference objects and subsequent use of device 10 will start the computation of angular separation using the recently identified objects. Thus each user may have a favorite few reference objects easily identified for a particular location, the use of which will expedite calibration of device 10.

If device 10 is unable to match angles α, β, and γ to objects in the database, a user may be prompted to select one or more additional reference objects to calibrate device 10.

Database 24 may contain data such as:

|  | ra | dec | Sirius | | Canopus | | A. Centauri | |
|---|---|---|---|---|---|---|---|---|
|  |  |  | ra | dec | ra | dec | ra | dec |
|  |  |  | 101.2871 | 15.2839 | 95.9883 | 51.3044 | 219.9008 | −59.1647 |
| Sirius | 101.2871 | 15.2839 | — | — | 5.2987 | 36.0206 | 118.6138 | 43.8808 |
| Canopus | 95.9883 | 51.3044 | 5.2987 | 36.0206 | — | — | 123.9125 | 7.8603 |
| A. Centauri | 219.9008 | 59.1647 | 118.6138 | 43.8808 | 123.9125 | 7.8603 | — | — |
| Arcturus | 213.9150 | 19.1825 | 112.6279 | 34.4664 | 117.9267 | 70.4869 | 5.9858 | 78.3472 |
| Vega | 279.2342 | 38.7836 | 177.9471 | 54.0675 | 183.2458 | 90.0881 | 59.3333 | 97.9483 |

-continued

|  | ra | dec | Sirius ra | Sirius dec | Canopus ra | Canopus dec | A. Centauri ra | A. Centauri dec |
|---|---|---|---|---|---|---|---|---|
| Capella | 79.1721 | 45.9981 | 22.1150 | 61.2819 | 16.8163 | 97.3025 | 140.7288 | 105.1628 |
| Rigel | 78.6342 | −7.7983 | 22.6529 | 7.4856 | 17.3542 | 43.5061 | 141.2667 | 51.3664 |
| Procyon | 114.8254 | 5.2250 | 13.5383 | 20.5089 | 18.8371 | 56.5294 | 105.0754 | 64.3897 |
| Betelgeuse | 88.7929 | 7.4069 | 12.4942 | 22.6908 | 7.1954 | 58.7114 | 131.1079 | 66.5717 |
| Achernar | 24.4288 | 56.7633 | 76.8583 | 41.4794 | 71.5596 | 5.4589 | 195.4721 | 2.4014 |

The angular data may adopt any suitable format such as degrees with a decimal, or a conventional degrees:minutes:seconds, or any other suitable format.

Figure 6:
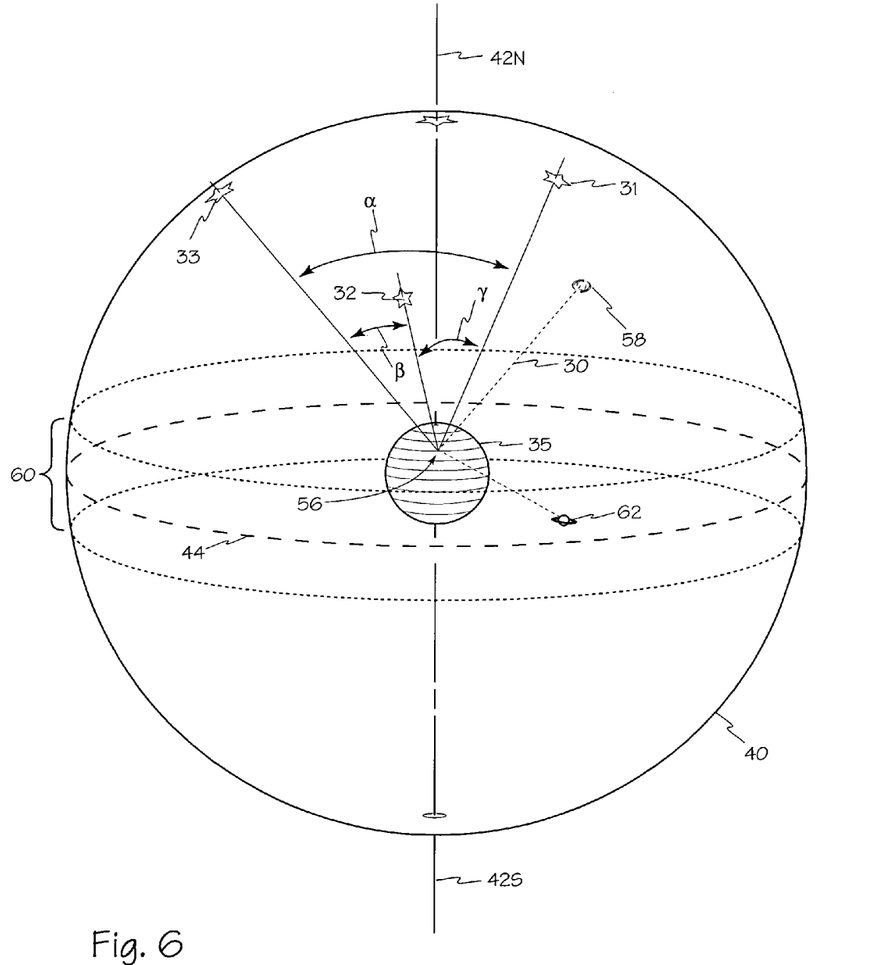
FIG. 6 is a high level perspective diagram of the relative orientation of a celestial object locating device and celestial objects.

Referring now to FIG. 6, a user at position 56 on earth 35 may complete calibration of a celestial object locating device such as device 10 using two or more stars such as stars 31, 32 and 33 as reference objects apparently located on celestial sphere 40. As a result of the calibration, the orientation of celestial sphere 40 is known which permits identification of north celestial pole 42N, south celestial pole 42S and celestial meridian 44, and ecliptic 60. Ecliptic band 60 is where the objects of the solar system such as planets, asteroids and others will be visible. From the orientation of celestial sphere, device 10 may be used to direct a user to any object included in database 22. Device 10 may also be used to provide information to a user about any suitable celestial object at which viewing axis 30 is oriented, such as deep sky object 58, from data in database 22. Accurate identification and location of stars may be obtained in this manner without resort to terrestrial time and location data.

Identification and location of planets without obtaining time and location data from an external source is more problematic, but may be achieved by employing assumptions regarding otherwise unidentifiable objects. To identify and locate planets accurately, the device must know the accurate date. The device described above may obtain accurate identification and location of stars without reference to time, date and location which may entail expensive GPS hardware or tedious manual data entry. The device may determine the date and or time in the following manner.

If the user sights an object unidentifiable per the method described above, and the object is outside ecliptic 60, the device will merely report that the object cannot be identified. If the user sights an object unidentifiable per the method described above, and the object is within the ecliptic, the device will assume that the object is a solar system object such as a planet or the moon. If the device is already calibrated to the stars as described above, and thus knows its location relative to the celestial coordinates, and given that it knows its orientation through the sensors, if it is assumed that the unidentifiable object is a planet, the device may calculate the date and or local time from orbital data for solar system objects.

The calculations may be simplified by certain assumptions, such as (1) Venus and Mercury are not visible above known azimuths, (that is, these inner planets are only visible when they are close to the horizon), therefore an unidentified object, in the ecliptic, well above the horizon, can only be Mars, Saturn, or Jupiter and (2) in a device without optics, only the visible planets need be considered, and (3) in a short epoch (whether it be a standard fifty-year epoch such as J2000, or a shorter or longer arbitrarily defined epoch) planetary positions will be unambiguous. Thus, for example, if the user sights an object (Jupiter) high in the sky within the band of the ecliptic, it will not match a star in the database. The device will then assume that the object is a planet and calculate from the object location relative to the celestial sphere to determine if the coordinates of the object are consistent with a single unambiguous possible position of Mars, Jupiter, Saturn and at what pre-calculated date and or time during that epoch the matching planet would be found on the sensed viewing angle, or on the corresponding horizon or celestial coordinates. If device 10 finds a match, it may set the system to the calculated date and or time, and on that basis device 10 could find other planets or solar system objects. Thus the time variable positions of solar objects relative to celestial coordinates, and the typically unambiguous wide angular distance between the planets, may be used to determine the date and or local time from any one of the visible planets.

Accordingly, once calibration step 50 is completed, a user may select an object such as object 62 (Saturn) in ecliptic band 60 that device 10 is unable to match to an object in database 22. The device 10 may try to match a selected object from ecliptic band 60 to database 22p of planetary data. By comparing the planetary data of unknown object 62 to the calibrated celestial sphere, device 10 may identify object 62 and thereby identify the date and or time at the user's location. Thereafter, the device can operate to find and identify other planets and other objects not fixed in celestial coordinates.

The calculation of date and or time using the above process is a function of the accuracy of the device. Using a handheld device it may only be possible to get the current date. With a device having an average mount and an accurate viewing axis it may be possible to get the current date and approximate time. If the device were incorporated into a very stable telescope with a very narrow field of view, it may be possible to resolve the angular position of the stars and planets sufficiently to yield the current date and the current time to an accuracy of a minute.

This process may also have one or more periods in a given epoch in which planetary data may yield ambiguous results such as during periods of apparent retrograde motion of a given planet. During these periods of apparent retrograde motion the celestial object location device may only be able to identify the planet and identify that the planet is in an apparent retrograde period and thus time data may not be available and the date may only be determinable within a range of weeks. If, for example the identified planet is Mars, it may be possible to then locate the outer planets because of the apparently slow movement of the outer planets against the celestial sphere.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A method of identifying a celestial object using a device having a viewing axis comprising the steps:
   sighting along the viewing axis to sight a first reference object;
   selecting a first reference object and capturing first magnetic data and first altitude data;
   sighting along the viewing axis to sight a second reference object;
   selecting a second reference object and capturing second magnetic data and second altitude data;
   sighting along the viewing axis to sight a third reference object;
   selecting a third reference object and capturing third magnetic data and third altitude data;
   computing the angles between the first, second and third reference objects using the first, second and third magnetic data and the first, second and third altitude data;
   determining the orientation angle of the celestial sphere by comparing the computed angles to a database to unambiguously identify the first reference object, the second reference object and the third reference object;
   storing the orientation angle;
   sighting along the viewing axis to sight a celestial object of interest;
   selecting the celestial object of interest and capturing object magnetic data and object altitude data;
   using the orientation angle and the object magnetic data and the object altitude data to identify the celestial object of interest;
   presenting information about the celestial object of interest to a user.

2. The method of claim 1 wherein the step of capturing first magnetic data and first altitude data further comprises:
   starting a timer;
   and the step of capturing second magnetic data and second altitude data further comprises;
   capturing first elapsed time;
   and the step of capturing third magnetic data and third altitude data further comprises;
   capturing second elapsed time;
   and the step of computing the angles between the first, second and third reference objects comprises;
   computing the angles between the first, second and third reference objects using the first, second and third magnetic data and the first, second and third altitude data, and the first and second elapsed times.

3. The method of claim 1 further comprising the steps:
   sighting along the viewing axis to sight an unknown object within the ecliptic;
   selecting the unknown object and capturing magnetic data and altitude data;
   comparing the orientation angle, the magnetic data and the altitude date and solar system object orbital data to determine the identity of the unknown object;
   comparing the orientation angle relative to the unknown object to determine local date;
   displaying the local date to the user.

4. The method of claim 1 further comprising the steps:
   sighting along the viewing axis to sight an unknown object within the ecliptic;
   selecting the unknown object and capturing magnetic data and altitude data corresponding to the unknown object;
   comparing the orientation angle, the magnetic data and the altitude date and solar system object orbital data to determine the identity of the unknown object;
   using the orientation angle of the unknown object, and the determined identity of the unknown object, to determine the current date; and
   using the current date to aid in identification of additional celestial objects.

5. The method of claim 1 further comprising the steps of:
   sighting along the viewing axis to sight a celestial object which is a solar system object within the ecliptic;
   selecting the solar system object and capturing magnetic data and altitude data corresponding to the solar system object;
   determining that the magnetic data and the altitude data of the solar system object do not match a known star, thereafter comparing the magnetic data and the altitude data with solar system object orbital data to determine the identity of the solar system object and to determine the current date;
   using the current date to identify additional solar system objects sighted along the viewing axis.

6. The method of claim 1 further comprising the steps of:
   sighting along the viewing axis to sight a celestial object which is a solar system object within the ecliptic;
   selecting the solar system object and capturing magnetic data and altitude data corresponding to the solar system object;
   determining that the magnetic data and the altitude data do not match a known star, thereafter comparing the magnetic data and the altitude data with solar system object orbital data to determine the identity of the solar system object and to determine the current date and time;
   using the current date and time to identify additional solar system objects sighted along the viewing axis.

7. A method of identifying a celestial object using a device having a viewing axis comprising the steps of:
   sighting along the viewing axis to sight a first reference object;
   selecting a first reference object and capturing first magnetic data and first altitude data;
   sighting along the viewing axis to sight a second reference object;
   selecting a second reference object and capturing second magnetic data and second altitude data;
   computing the angles between the first and second reference objects using the first and second magnetic data and the first and second altitude data;
   determining an orientation angle for the celestial sphere by comparing the computed angle to a database to unambiguously identify the first reference object and the second reference object;
   using the orientation angle and magnetic data and altitude data to identify the celestial object;
   notifying the user that calibration is incomplete and one or more additional reference objects must be selected;
   sighting along the viewing axis to sight an additional reference object;
   selecting the additional reference object and capturing additional magnetic data and additional altitude data;
   computing the angles between the first and second and the one or more additional reference objects using the first, second and additional magnetic data and the first, second and additional altitude data;
   determining an orientation angle of the celestial sphere by comparing the computed angles to a database to unambiguously identify the first reference object, the second reference object and the one or more additional reference objects;
   using the orientation angle and magnetic data and altitude data to identify the celestial object.

\* \* \* \* \*